(12) United States Patent
Yang et al.

(10) Patent No.: US 12,143,869 B2
(45) Date of Patent: Nov. 12, 2024

(54) COMMUNICATION METHOD AND APPARATUS

(71) Applicant: HUAWEI TECHNOLOGIES CO., LTD., Shenzhen (CN)

(72) Inventors: Shuigen Yang, Shanghai (CN); Henrik Olofsson, Kista (SE); Feng Han, Shanghai (CN); Wei Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 624 days.

(21) Appl. No.: 17/245,231

(22) Filed: Apr. 30, 2021

(65) Prior Publication Data

US 2021/0250819 A1 Aug. 12, 2021

Related U.S. Application Data

(63) Continuation of application No. PCT/CN2019/115018, filed on Nov. 1, 2019.

(30) Foreign Application Priority Data

Nov. 2, 2018 (CN) .......................... 201811303301.6

(51) Int. Cl.
*H04W 36/00* (2009.01)
*H04W 28/06* (2009.01)
*H04W 76/27* (2018.01)

(52) U.S. Cl.
CPC ....... *H04W 36/0033* (2013.01); *H04W 28/06* (2013.01); *H04W 76/27* (2018.02)

(58) Field of Classification Search
CPC .. H04W 36/0033; H04W 76/27; H04W 28/06
See application file for complete search history.

(56) References Cited

U.S. PATENT DOCUMENTS

2020/0053617 A1* 2/2020 Park ................. H04W 36/0066

FOREIGN PATENT DOCUMENTS

| CN | 105898894 A | 8/2016 |
|---|---|---|
| CN | 106572516 A | 4/2017 |
| CN | 107708109 A | 2/2018 |
| CN | 107820291 A | 3/2018 |

(Continued)

OTHER PUBLICATIONS

3GPP TR 23.740 V0.6.0 (Oct. 2018), 3rd Generation Partnership Project; Technical Specification Group Services and System Aspects; Study on Enhancement of Network Slicing(Release 16), 68 pages.

(Continued)

*Primary Examiner* — Justin Y Lee
(74) *Attorney, Agent, or Firm* — Rimon PC

(57) ABSTRACT

This application provides a communication method and apparatus, to help a terminal device obtain a better service. The method includes: sending, by an access network device, an initial user equipment UE message to a core network device; and receiving, by the access network device, an initial context setup request message sent by the core network device, where the initial context setup request message includes first information, and the first information is used to indicate at least one network slice preferentially used by a terminal device.

17 Claims, 4 Drawing Sheets

(56) References Cited

FOREIGN PATENT DOCUMENTS

| CN | 108347751 A | 7/2018 |
|---|---|---|
| CN | 108366365 A | 8/2018 |
| EP | 3567928 A1 | 11/2019 |
| WO | 2018034924 A1 | 2/2018 |
| WO | 2018093168 A1 | 5/2018 |
| WO | 2018127065 A1 | 7/2018 |
| WO | 2018171904 A1 | 9/2018 |

OTHER PUBLICATIONS

3GPP TS 38.300 V15.3.0 (Sep. 2018), 3rd Generation Partnership Project; Technical Specification Group Radio Access Network; NR; NR and NG-RAN Overall Description; Stage 2(Release 15), 92 pages.

3GPP TSG-RAN WG2 Meeting#AH-1807, R2-1809971:"Further Discussion on Slice Information over RRC", Huawei, HiSilicon, Montreal, Canada, Jul. 2-6, 2018, total 4 pages.

\* cited by examiner

COMMUNICATION METHOD AND APPARATUS

CROSS-REFERENCE TO RELATED APPLICATIONS

This application is a continuation of International Application No. PCT/CN2019/115018, filed on Nov. 1, 2019, which claims priority to Chinese Patent Application No. 201811303301.6, filed on Nov. 2, 2018. The disclosures of the aforementioned applications are hereby incorporated by reference in their entireties.

TECHNICAL FIELD

This application relates to the communications field, and more specifically, to a communication method and apparatus.

BACKGROUND

As a key technology of 5th generation (5G) communication, network slices have been widely valued and researched by the 3rd generation partnership project (3GPP) and various other international standard organizations, and can meet customization requirements of an operator on various industries, vertical markets, and virtual operation services.

In a current technology, when a terminal device needs to register with a network slice, the terminal device provides requested network slice selection assistance information (Requested NSSAI) to a core network by using an access network device. The Requested NSSAI includes one piece or a group of single network slice selection assistance information (S-NSSAI), and one piece of S-NSSAI may be used to identify a specific network slice. The core network determines allowed network slice selection assistance information (Allowed NSSAI) of the terminal device based on the Requested NSSAI, a local configuration, a radio access network capability of a tracking area in which the terminal device is currently located, and other local usable information (for example, load level information of a network slice), and sends the Allowed NSSAI to the terminal device and the access network device. The Allowed NSSAI is used to indicate S-NSSAI that may be used in all tracking areas in a current registration area by the terminal device.

Allowed NSSAI may include a plurality of pieces of S-NSSAI. According to the current technology, the access network device enables the terminal device to access randomly-selected one piece of S-NSSAI. Because quality of service of different S-NSSAI may be different, this manner of blindly selecting S-NSSAI is not conducive to obtaining a better service by the terminal device.

SUMMARY

This application provides a communication method and apparatus, to help a terminal device obtain a better service.

According to a first aspect, a communication method is provided, and includes: An access network device sends an initial user equipment UE message to a core network device. The access network device receives an initial context setup request message sent by the core network device, where the initial context setup request message includes first information, and the first information is used to indicate at least one network slice preferentially used by a terminal device.

Further, the first information is further used to indicate a priority of the at least one network slice.

In this application, the network slice preferentially used by the terminal device may be a network slice that the terminal device expects to access, and the network slice may provide a better service to the terminal device. For example, the network slice preferentially used by the terminal device may be a network slice in which the terminal device expects to preferentially set up a protocol data unit (PDU) session, or may be a network slice with which the terminal device expects to preferentially register. For example, network slices subscribed to by the terminal device include a slice #1, a slice #2, and a slice #3, and bandwidths corresponding to the three slices are 20 MHz, 50 MHz, and 100 MHz in sequence. In this case, a network slice preferentially used by the terminal device is the slice #3, or the slice #3 and the slice #2.

Optionally, the at least one network slice may belong to a network slice that allows to be used by the terminal device. However, this is not limited in the embodiments of this application. For example, the at least one network slice may not belong to the network slice that allows to be used by the terminal device, or the at least one network slice may include a portion or all of the network slice that allows to be used by the terminal device and one or more network slices that do not belong to the network slice that allows to be used by the terminal device. A network slice that allows to be used by the terminal device may correspond to the Allowed NSSAI in the foregoing descriptions, and details are not described herein again.

Optionally, the first information is obtained by the core network device from subscription information of the terminal device;

the first information is determined by the core network device based on one or more of subscription information of the terminal device, operator configuration information, and requested network slice information of the terminal device; or the first information is preconfigured for the core network device by an operation, administration and maintenance system.

According to the communication method in this embodiment of this application, the core network device sends, to the access network device, information about the at least one network slice preferentially used by the terminal device, or information about the at least one network slice preferentially used by the terminal device and information about the priority of the at least one network slice, so that the access network device may enable the terminal device to access an appropriate network slice, in other words, the access network device may enable the terminal device to access a proper network slice, to help the terminal device obtain an appropriate service.

For example, network slices included in Requested NSSAI are {slice #1, slice #2, slice #3}, network slices supported by a current tracking area are {slice #2, slice #3, slice #4, slice #5}, and network slices supported by all tracking areas in a current registration area are {slice #3, slice #4}. In this case, a network slice included in Allowed NSSAI is {slice #3}. However, based on the subscription information of the terminal device, a preferable network slice of the terminal device is the slice #2. If the initial context setup request message sent by the core network device to the access network device includes only the Allowed NSSAI according to a current technology, the access network device allows the terminal device to access only the slice #3. Compared with the slice #3, the slice #2 provides a better service. Therefore, according to this application, the initial context setup request message sent by the core network device to the access network device includes information about the slice #2 preferentially used by the terminal device. In this case, the access network device may trigger the terminal device to release an RRC connection, so as to perform cell reselection, or trigger a handover process. In this way, the terminal device may access the slice #2, to obtain a proper or a better service.

For another example, network slices included in Requested NSSAI are {slice #1, slice #2, slice #3, slice #4, slice #5}, network slices supported by a current tracking area are {slice #2, slice #3, slice #4, slice #5}, and network slices supported by all tracking areas in a current registration area are {slice #3, slice #4, slice #5}. In this case, network slices included in the Allowed NSSAI are {slice #3, slice #4, slice #5}. However, based on the subscription information of the terminal device, preferable network slices of the terminal device are {slice #3, slice #4}, and a priority of the slice #3 is higher than that of the slice #4. If the initial context setup request message sent by the core network device to the access network device includes only the Allowed NSSAI according to a current technology, the access network device randomly allows the terminal device to access the slice #3, slice #4, or slice #5. However, according to this application, the initial context setup request message sent by the core network device to the access network device includes the slice #3 and slice #4 that are preferentially used by the terminal device, and the priority of the slice #3 is higher than the priority of the slice #4. In this case, the access network device allows the terminal device to access the slice #3, to help the terminal device obtain a better service.

In a possible implementation, the method further includes:

The access network device sends a radio resource control (RRC) reconfiguration message to the terminal device, where the RRC reconfiguration message is determined based on the first information, to enable the terminal device to access a portion or all of the at least one network slice.

In this way, when the portion or all of the at least one network slice preferentially used by the terminal device belongs to a network slice that allows to be used by the terminal device, and the access network device supports the portion or all of the network slice, the access network device may enable the terminal device to access a network slice that is preferentially used by the terminal device and that allows to be used by the terminal device.

In another possible implementation, the method further includes:

The access network device triggers handover of the terminal device or release of a RRC connection.

If any one of the at least one network slice preferentially used by the terminal device or a network slice with a highest priority in the at least one network slice does not belong to a network slice that allows to be used by the terminal device, or the access network device does not support any one of the at least one network slice or the network slice with the highest priority, the access network device may trigger the handover of the terminal device or the release of the RRC connection. After the RRC connection is released, the terminal device may perform cell reselection. Optionally, the access network device may further provide the first information to the terminal device, so that the terminal device may preferentially access a network slice preferentially used by the terminal device. For example, the access network device may provide the first information to the terminal device in a process of triggering the handover of the terminal device or the release of the RRC connection.

According to a second aspect, a communication method is provided, and includes: A core network device receives an initial user equipment UE message sent by an access network device. The core network device sends an initial context setup request message to the access network device, where the initial context setup request message includes first information, and the first information is used to indicate at least one network slice preferentially used by a terminal device.

In a possible implementation, the first information is further used to indicate a priority of the at least one network slice.

In a possible implementation, the first information is obtained by the core network device from subscription information of the terminal device;

the first information is determined by the core network device based on one or more of subscription information of the terminal device, operator configuration information, and requested network slice information of the terminal device; or the first information is preconfigured for the core network device by an operation, administration and maintenance system.

For details of the second aspect, refer to the descriptions of the first aspect. Details are not described herein again.

According to a third aspect, a communication method is provided, and includes: A target access network device receives a handover request message sent by a source access network device, where the handover request message includes first information, and the first information is used to indicate at least one network slice preferentially used by a terminal device.

The target access network device sends a handover request response to the source access network device based on the first information.

Further, the first information is further used to indicate a priority of the at least one network slice.

Optionally, the first information is obtained by the source access network device from subscription information of the terminal device;

the first information is determined by the source access network device based on one or more of subscription information of the terminal device, operator configuration information, and requested network slice information of the terminal device; or the first information is preconfigured for the source access network device by an operation, administration and maintenance system.

According to the method in this embodiment of this application, the source access network device sends the first information to the target access network device, so that when supporting the network slice preferentially used by the terminal device, the target access network device may enable the terminal device to access the network slice preferentially used by the terminal device.

For example, network slices included in Requested NSSAI are {slice #1, slice #2, slice #3}, network slices supported by a current tracking area are {slice #2, slice #3, slice #4, slice #5}, and network slices supported by all tracking areas in a current registration area are {slice #3, slice #4}. In this case, a network slice included in Allowed NSSAI is {slice #3}. However, based on the subscription information of the terminal device, a preferable network slice of the terminal device is the slice #2. According to a current technology, the access network device allows the terminal device to access only the slice #3. Compared with the slice #3, the slice #2 provides a better service. Therefore, according to this application, the handover request message sent by the source access network device to the target access network device includes information about the slice #2 preferentially used by the terminal device. In this case, the target access network device may trigger the terminal device to reject handover, so that the terminal device may access the slice #2, to obtain a proper or better service.

For another example, network slices included in Requested NSSAI are {slice #1, slice #2, slice #3, slice #4, slice #5}, network slices supported by a current tracking area are {slice #2, slice #3, slice #4, slice #5}, and network slices supported by all tracking areas in a current registration area are {slice #3, slice #4, slice #5}. In this case, network slices included in the Allowed NSSAI are {slice #3, slice #4, slice #5}. However, based on the subscription information of the terminal device, preferable network slices of the terminal device are {slice #3, slice #4}, and a priority of the slice #3 is higher than that of the slice #4. According to the current technology, the target access network device randomly allows the terminal device to access the slice #3, the slice #4, or the slice #5. However, according to this application, the handover request message sent by the source access network device to the target access network device includes the slice #3 and slice #4 that are preferentially used by the terminal device, and the priority of the slice #3 is higher than the priority of the slice #4. In this case, the target access network device allows the terminal device to access the slice #3, to help the terminal device obtain a better service.

In a possible implementation, that the target access network device sends a handover request response to the source access network device based on the first information includes:

The target access network device sends the handover request acknowledge message to the source access network device when the target access network device determines to enable the terminal device to access a portion or all of the at least one network slice.

For example, if the target access network device supports a portion or all of the at least one network slice or supports a network slice with a highest priority in the at least one network slice, and the portion or all of the network slice or the network slice with the highest priority belongs to a network slice that allows to be used by the terminal device, the target access network device may send a handover request acknowledge message to the source access network device, to enable the terminal device to access the portion or all of the network slice or the network slice with the highest priority.

In a possible implementation, that the target access network device sends a handover request response to the source access network device based on the first information includes:

The target access network device sends the handover preparation failure message to the source access network device when the target access network device determines not to enable the terminal device to access a portion or all of the at least one network slice.

According to a fourth aspect, a communication method is provided, and includes:

A source access network device sends a handover request message to a target access network device when determining that a terminal device needs to be handed over to the target access network device, where the handover request message includes first information, and the first information is used to indicate at least one network slice preferentially used by the terminal device.

The source access network device receives a handover request acknowledge message sent by the target access network device.

The source access network device hands over the terminal device to the target access network device based on the handover request acknowledge message.

In a possible implementation, the first information is further used to indicate a priority of the at least one network slice.

In a possible implementation, the first information is obtained by the source access network device from subscription information of the terminal device;

the first information is determined by the source access network device based on one or more of subscription information of the terminal device, operator configuration information, and requested network slice information of the terminal device; or the first information is preconfigured for the source access network device by an operation, administration and maintenance system.

For details of the fourth aspect, refer to the descriptions of the third aspect. Details are not described herein again.

According to a fifth aspect, a communication method is provided, and includes:

A first access network device receives a retrieve UE context request message sent by a second access network device.

The first access network device sends a retrieve UE context response message to the second access network device, where the retrieve UE context response message includes first information, and the first information is used to indicate at least one network slice preferentially used by a terminal device.

Optionally, the first information is further used to indicate a priority of the at least one network slice.

Optionally, the first information is obtained by the first access network device from subscription information of the terminal device;

the first information is determined by the first access network device based on one or more of subscription information of the terminal device, operator configuration information, and requested network slice information of the terminal device; or the first information is preconfigured for the first access network device by an operation, administration and maintenance system.

In this embodiment of this application, in a process in which the terminal device is switched from an inactive mode to a connected mode, the second access network device on which the terminal device currently camps receives a retrieve terminal device context response message from the first access network device on which the terminal device camps last time, and the retrieve terminal device context response message includes information about the at least one network slice preferentially used by the terminal device and/or the priority of the at least one network slice, so that the first access network device enables, based on the information, the terminal device to access the network slice preferentially used by the terminal device.

For example, network slices included in Requested NSSAI are {slice #1, slice #2, slice #3, slice #4, slice #5}, network slices supported by a current tracking area are {slice #2, slice #3, slice #4, slice #5}, and network slices supported by all tracking areas in a current registration area are {slice #3, slice #4, slice #5}. In this case, network slices included in Allowed NSSAI are {slice #3, slice #4, slice #5}. However, based on the subscription information of the terminal device, preferable network slices of the terminal device are {slice #3, slice #4}, and a priority of the slice #3 is higher than that of the slice #4. According to a current technology, the target access network device randomly allows the terminal device to access the slice #3, the slice #4, or the slice #5. However, according to this application, the retrieve UE context response message sent by the first access network device to the second access network device includes the slice #3 and slice #4 that are preferentially used by the terminal device, and the priority of the slice #3 is higher than the priority of the slice #4. In this case, the target access network device allows the terminal device to access the slice #3, to help the terminal device obtain a better service.

According to a sixth aspect, a communication method is provided, and includes:

A second access network device sends a retrieve UE context request message to a first access network device.

The second access network device receives a retrieve UE context response message sent by the first access network device, where the retrieve UE context response message includes first information, and the first information is used to indicate at least one network slice preferentially used by a terminal device.

In a possible implementation, the first information is further used to indicate a priority of the at least one network slice.

In a possible implementation, the method further includes:

The access network device sends a RRC reconfiguration message to the terminal device, where the RRC reconfiguration message is determined based on the first information, to enable the terminal device to access a portion or all of the at least one network slice.

The access network device triggers handover of the terminal device or release of a RRC connection.

In a possible implementation, the first information is obtained by the first access network device from subscription information of the terminal device;

the first information is determined by the first access network device based on one or more of subscription information of the terminal device, operator configuration information, and requested network slice information of the terminal device; or the first information is preconfigured for the first access network device by an operation, administration and maintenance system.

For details of the sixth aspect, refer to the descriptions of the fifth aspect. Details are not described herein again.

According to a seventh aspect, a communication method is provided, and includes: A core network device receives a path switch request message sent by a target access network device. The core network device sends a path switch request acknowledge message to the target access network device, where the path switch request acknowledge message includes first information, and the first information is used to indicate at least one network slice preferentially used by a terminal device.

Further, the first information is further used to indicate a priority of the at least one network slice.

Optionally, the first information is obtained by the core network device from subscription information of the terminal device;

the first information is determined by the core network device based on one or more of subscription information of the terminal device, operator configuration information, and requested network slice information of the terminal device; or the first information is preconfigured for the core network device by an operation, administration and maintenance system.

According to the method in this embodiment of this application, the core network device sends the first information to the target access network device, so that when supporting the network slice preferentially used by the terminal device, the target access network device may enable the terminal device to access the network slice preferentially used by the terminal device.

For example, network slices included in Requested NSSAI are {slice #1, slice #2, slice #3, slice #4, slice #5}, network slices supported by a current tracking area are {slice #2, slice #3, slice #4, slice #5}, and network slices supported by all tracking areas in a current registration area are {slice #3, slice #4, slice #5}. In this case, network slices included in the Allowed NSSAI are {slice #3, slice #4, slice #5}. However, based on the subscription information of the terminal device, preferable network slices of the terminal device are {slice #3, slice #4}, and a priority of the slice #3 is higher than that of the slice #4. According to a current technology, the target access network device randomly allows the terminal device to access the slice #3, the slice #4, or the slice #5. However, according to this application, the path switch request acknowledge message sent by the core network device to the target access network device includes the slice #3 and slice #4 that are preferentially used by the terminal device, and the priority of the slice #3 is higher than the priority of the slice #4. In this case, the target access network device allows the terminal device to access the slice #3, to help the terminal device obtain a better service.

According to an eighth aspect, a communication method is provided, and includes: A target access network device sends a path switch request message to a core network device. The target access network device receives a path switch request acknowledge message sent by the core network device.

Further, the first information is further used to indicate a priority of the at least one network slice.

Optionally, the first information is obtained by the core network device from subscription information of the terminal device;

the first information is determined by the core network device based on one or more of subscription information of the terminal device, operator configuration information, and requested network slice information of the terminal device; or the first information is preconfigured for the core network device by an operation, administration and maintenance system.

For details of the eighth aspect, refer to the descriptions of the seventh aspect. Details are not described herein again.

According to a ninth aspect, a communication method is provided, and includes: A first network element determines at least one network slice preferentially used by a terminal device. The first network element sends first information to a second network element, where the first information is used to indicate the at least one network slice.

The second network element may be an access network device. In other words, the access network device may obtain information about the at least one network slice preferentially used by the terminal device, or may obtain both information about the at least one network slice preferentially used by the terminal device and information about a priority of the at least one network slice. In this way, the access network device may enable the terminal device to access the network slice preferentially used by the terminal device.

The second network element may alternatively be a core network device. In other words, the core network device may obtain information about the at least one network slice preferentially used by the terminal device, or may obtain both information about the at least one network slice preferentially used by the terminal device and information about a priority of the at least one network slice. Then, the core network device may use, as a network slice that allows to be used by the terminal device, a portion or all of the at least one network slice preferentially used by the terminal device, or a network slice with a highest priority in the at least one network slice. In this way, the access network device may enable the terminal device to access the network slice preferentially used by the terminal device.

In conclusion, the method according to this embodiment of this application helps the access network device preferentially use the network slice preferentially used by the terminal device or enable the terminal device to access the network slice preferentially used by the terminal device, to help the terminal device obtain a better service.

In a possible implementation, the method further includes:

The first network element determines the priority of the at least one network slice, where the first information is further used to indicate the priority of the at least one network slice.

In a possible implementation, the first network element is a core network device, and the second network element is an access network device.

That the first network element sends first information to a second network element includes:

The first network element sends an initial context setup request message to the second network element, where the initial context setup request message includes the first information.

In a possible implementation, the first network element is a first access network device, and the second network element is a second access network device.

That the first network element sends first information to a second network element includes:

The first network element sends a handover request message to the second network element, where the handover request message includes the first information; or the first network element sends a retrieve UE context response message to the second network element, where the retrieve UE context response message includes the first information.

In a possible implementation, the first network element is a core network device, and the second network element is a target access network device.

That the first network element sends first information to a second network element includes:

The first network element sends a path switch request acknowledge message to the second network element, where the path switch request acknowledge message includes the first information.

In a possible implementation, the first network element is an access network device, and the second network element is a core network device.

That the first network element sends first information to a second network element includes:

The first network element sends an initial UE message to the second network element, where the initial UE message includes the first information, and the first information is used by the second network element to determine a network slice that allows to be used by the terminal device.

In a possible implementation, the method further includes:

The first network element receives second information sent by the second network element, where the second information is used to indicate a network slice that allows to be used by the terminal device, and the network slice that allows to be used by the terminal device includes a portion or all of the at least one network slice, or includes a network slice with a highest priority in the at least one network slice.

In a possible implementation, that the first network element determines the at least one network slice preferentially used by the terminal device, or determines the at least one network slice and the priority of the at least one network slice includes:

Based on subscription information of the terminal device, the first network element determines the at least one network slice, or determines the at least one network slice and the priority of the at least one network slice;

based on subscription information of the terminal device and operator configuration information, the first network element determines the at least one network slice, or determines the at least one network slice and the priority of the at least one network slice; or based on information preconfigured for the first network element by an operation, administration and maintenance system, the first network element determines the at least one network slice, or determines the at least one network slice and the priority of the at least one network slice.

In a possible implementation, the at least one network slice belongs to a network slice that allows to be used by the terminal device, or the at least one network slice does not belong to the network slice that allows to be used by the terminal device, or the at least one network slice includes a portion or all of the network slice that allows to be used by the terminal device and one or more network slices that do not belong to the network slice that allows to be used by the terminal device.

According to a tenth aspect, a communication method is provided, and includes: A second network element receives first information sent by a first network element.

The second network element determines, based on the first information, at least one network slice preferentially used by a terminal device, or the first information is used to indicate the at least one network slice and a priority of the at least one network slice.

In a possible implementation, the first network element is a core network device, and the second network element is an access network device.

That a second network element receives first information sent by a first network element includes:

The second network element receives an initial context setup request message sent by the first network element, where the initial context setup request message includes the first information.

In a possible implementation, the first network element is a first access network device, and the second network element is a second access network device.

That a second network element receives first information sent by a first network element includes:

The second network element receives a handover request message sent by the first network element, where the handover request message includes the first information; or the second network element receives a retrieve UE context response message sent by the first network element, where the retrieve UE context response message includes the first information.

In a possible implementation, the first network element is a core network device, and the second network element is a target access network device.

That a second network element receives first information sent by a first network element includes:

The second network element receives a path switch request acknowledge message sent by the first network element, where the path switch request acknowledge message includes the first information.

In a possible implementation, the method further includes at least one of the following:

The second network element stores the first information in a context of the terminal device.

When a portion or all of the at least one network slice belongs to a network slice that allows to be used by the terminal device, the second network element preferentially uses one or more network slices that are in the at least one network slice and that belong to the network slice that allows to be used by the terminal device.

When a network slice with a highest priority in the at least one network slice belongs to a network slice that allows to be used by the terminal device, the second network element preferentially uses the network slice with the highest priority.

When any one of the at least one network slice does not belong to a network slice that allows to be used by the terminal device, the second network element triggers handover of the terminal device or release of a RRC connection.

When a network slice with a highest priority in the at least one network slice does not belong to a network slice that allows to be used by the terminal device, the second network element triggers handover of the terminal device or release of a RRC connection.

In a possible implementation, the first network element is an access network device, and the second network element is a core network device.

That a second network element receives first information sent by a first network element includes:

The second network element receives an initial UE message sent by the first network element, where the initial UE message includes the first information.

In a possible implementation, the method further includes:

The second network element determines, based on the first information, a network slice that allows to be used by the terminal device, where the network slice that allows to be used by the terminal device includes a portion or all of the at least one network slice, or includes a network slice with a highest priority in the at least one network slice.

The second network element sends, to the first network element, information about the network slice that allows to be used by the terminal device.

In a possible implementation, the at least one network slice belongs to a network slice that allows to be used by the terminal device, or the at least one network slice does not belong to the network slice that allows to be used by the terminal device, or the at least one network slice includes a portion or all of the network slice that allows to be used by the terminal device and one or more network slices that do not belong to the network slice that allows to be used by the terminal device.

According to an eleventh aspect, a communications apparatus is provided, and includes units configured to perform the steps in any one of the first aspect to the tenth aspect and the implementations thereof.

According to a twelfth aspect, a communications device is provided, and includes a processor. The processor is coupled to a memory, and may be configured to execute instructions in the memory, to implement the method in any one of the first aspect to the tenth aspect and the implementations thereof.

Optionally, the communications apparatus further includes the memory. Optionally, the communications apparatus further includes a communications interface. The processor is coupled to the communications interface, and controls the communications interface to implement communication with another network element.

Optionally, the communications interface may be a transceiver or an input/output interface.

Optionally, the transceiver may be a transceiver circuit. Optionally, the input/output interface may be an input/output circuit.

According to a thirteenth aspect, a processor is provided, and includes an input circuit, an output circuit, and a processing circuit. The processing circuit is configured to: receive a signal through the input circuit, and transmit a signal through the output circuit, so that the processor performs the method according to any one of the first aspect to the tenth aspect or the possible implementations of the first aspect to the tenth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a fourteenth aspect, a processing apparatus is provided, and includes a processor and a memory. The processor is configured to: read instructions stored in the memory, receive a signal through a receiver, and transmit a signal through a transmitter, to perform the method according to any one of the first aspect to the tenth aspect or the possible implementations of the first aspect to the tenth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that a related data exchange process, for example, sending of first information, may be a process of outputting the first information from the processor, and receiving of first information, may be a process of receiving the input first information by the processor. Specifically, data output by the processor may be output to a transmitter, and input data received by the processor may be from a receiver. The transmitter and the receiver may be collectively referred to as a transceiver.

The processing apparatus according to the fourteenth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a fifteenth aspect, a chip system is provided, and includes a processor, configured to invoke a computer program from a memory and run the computer program, so that a device on which the chip system is installed performs the method in any one of the first aspect to the tenth aspect and the implementations thereof.

According to a sixteenth aspect, a computer program product is provided. The computer program product includes computer program code. When the computer program code is run by a communications unit, a processing unit, a transceiver, or a processor of a network management device (for example, the first network element or the second network element), the network management device is enabled to perform the method in any one of the first aspect to the tenth aspect and the implementations thereof.

According to a seventeenth aspect, a computer-readable storage medium is provided. The computer-readable storage medium stores a program, and the program enables a network management device (for example, the first network element or the second network element) to perform the method in any one of the first aspect to the tenth aspect and the implementations thereof.

DESCRIPTION OF EMBODIMENTS

Figure 1:
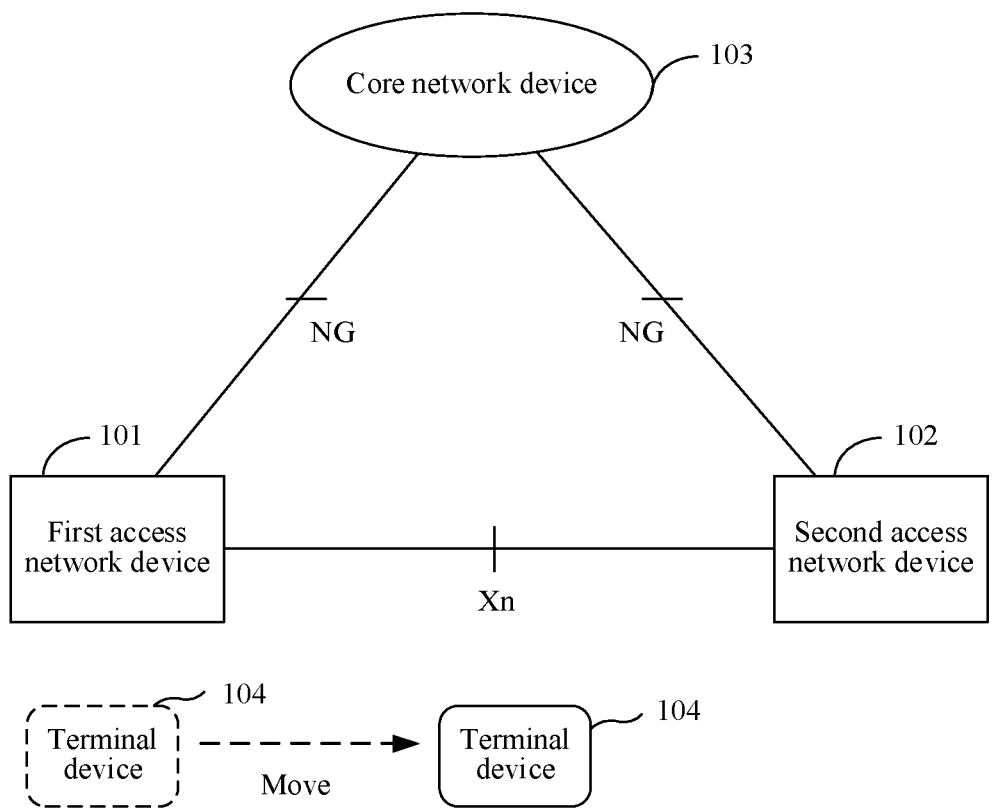
FIG. 1 is a schematic diagram of a communications system applicable to this application.

The following describes technical solutions of this application with reference to accompanying drawings.

The technical solutions in embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5th generation, 5G) system or new radio (NR) system, and a possible further communications system.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, or a terminal device in a future evolved public land mobile network (PLMN). This is not limited in the embodiments of this application.

An access network device in the embodiments of this application may be a device configured to communicate with the terminal device, and the access network device may be a radio access network (RAN) device. The RAN device may include various types of base stations. For example, the base stations in the embodiments of this application may include macro base stations, micro base stations, relay stations, access points, and the like in various forms. In systems using different radio access technologies, names of devices that have base station functions may be different. For example, in an LTE network, a device with a base station function is referred to as an evolved NodeB (eNB or eNodeB). In a 3rd generation (3G) network, a device with a base station function is referred to as a NodeB. In a 5th generation (5G) network, a device with a base station function is referred to as a gNodeB (gNB) or the like. This is not limited in the embodiments of this application.

A core network (CN) device in the embodiments of this application may be a control plane anchor of the terminal device, and the control plane anchor provides a function such as registration area update for the terminal device. For example, the core network device may include an access and mobility management function (AMF) entity. The core network device may be a network device configured to provide functions such as core access and mobility management for the terminal device. A specific function of the core network device may be similar to a function of a mobility management entity (MME) in an LTE system.

For ease of understanding, before the communication method and apparatus in this application are described, the following describes related terms in the embodiments of this application.

Network slice: Network slices are logical networks having different network capabilities and network features that are customized on physical or virtual network infrastructure according to different service requirements, tenants, or the like. A network slice may be a complete end-to-end network including a terminal device, an access network, a transport network, a core network, and an application server, can provide a telecommunications service, and has a specific network capability. Alternatively, a network slice may be any combination of the terminal device, the access network, the transport network, the core network, and the application server. For example, the network slice includes only the access network and the core network. A network slice may have one or more of the following features: The access network may support a network slice, or may not support a network slice, and the access network may be shared by a plurality of network slices. Different network slices may have different features and include different network function modules.

A network slice identifier may include but is not limited to at least one of the following: network slice type information, service type information, tenant (Tenant) information, user group information, slice group information, network slice instance information, a dedicated core network (DCN) identifier, single network slice selection assistance information (S-NSSAI), S-NSSAI group information, a temporary identifier (Temporary ID), R-NSSAI (RAN-NSSAI), or a network slice differentiator (SD).

Specific definitions of the foregoing terms are as follows:

Network slice type information. For example, the network slice type information may be used to indicate network slice types such as an enhanced mobile broadband (eMBB) service, ultra-reliable low-latency communications (URLLC), and massive machine-type communications (mMTC). Optionally, the network slice type information may alternatively indicate an end-to-end network slice type, including a RAN-to-CN network slice type, or may indicate a RAN-side network slice type, or a CN-side network slice type.

Network slice selection assistance information (NSSAI): The NSSAI is a value defined in a standard or a private value defined in the PLMN. One piece of NSSAI includes a plurality of pieces of S-NSSAI, and each piece of S-NSSAI may correspond to one specific slice.

Single network slice selection assistance information (single-nssai, S-NSSAI): The S-NSSAI may include two values: a slice/service type (SST) and a network slice differentiator (SD), or may include only a slice/service type.

Slice/Service type: The slice/service type represents a feature and a service that a network is expected to provide.

Network slice differentiator: The network slice differentiator is used as supplement information for the slice/service type during selection of a network slice instance. When the slice/service type points to a plurality of network slice instances, the slice differentiator may be further used to distinguish between these network slice instances.

S-NSSAI: The S-NSSAI may include at least slice/service type (SST) information, and optionally, may further include slice differentiator (SD) information. The SST information, such as a feature and a service type of a network slice, is used to indicate behavior of the network slice. The SD information is supplement information of the SST information. If the SST points to a plurality of network slice instances, the SD information may correspond to one unique network slice instance.

Tracking area (TA): The TA includes one or more cells. If a plurality of cells are included, the plurality of cells may belong to one base station, or may belong to a plurality of base stations.

Registration area (registration area, RA): The RA includes one or more TAs. If a terminal is out of coverage of the RA, the terminal triggers a registration area update process.

Allowed network slice selection assistance information (Allowed NSSAI): The Allowed NSSAI indicates network slice identification information allocated by a core network to a terminal when a registration area is updated or the terminal performs initial access, and indicates a service that can be initiated in a current registration area by the terminal, that is, a network slice to which a session that may be initiated belongs can be only in the Allowed NSSAI.

The following first briefly describes, with reference to FIG. 1, a communications system applicable to an embodiment of this application. As shown in FIG. 1, the system includes an access network device (for example, a first access network device 101 and/or a second access network device 102), a core network device 103, and a terminal device 104. The access network device may be connected to at least one terminal device, and the access network device may be connected to at least one core network device.

There is an interface, for example, an NG interface, between the core network device and the access network device. The core network device and the access network device may communicate with each other through the NG interface. There is not necessarily a communications interface between access network devices. If there is a communications interface, for example, an Xn interface, between the first access network device 101 and the second access network device 102, the first access network device 101 and the second access network device 102 may communicate with each other. If there is no communications interface between the first access network device 101 and the second access network device 102, the first access network device 101 and the second access network device 102 cannot communicate with each other, but may communicate with each other through forwarding by the core network device.

In a current technology, when a terminal device (for example, the terminal device 104) needs to register with a network slice, the terminal device provides requested network slice selection assistance information (Requested NSSAI) to a core network by using an access network device (for example, the first access network device 101 or the second access network device 102). The Requested NSSAI includes one piece of S-NSSAI or a group of S-NSSAI, and one piece of S-NSSAI may be used to identify one specific network slice. The core network determines allowed network slice selection assistance information (Allowed NSSAI) of the terminal device based on the Requested NSSAI, a local configuration, a radio access network capability of a tracking area in which the terminal device is currently located, and other local usable information (for example, load level information of a network slice), and sends the Allowed NSSAI to the terminal device and the access network device. The Allowed NSSAI is used to indicate S-NSSAI that may be used in all tracking areas in a current registration area by the terminal device.

Allowed NSSAI may include a plurality of pieces of S-NSSAI. According to the current technology, the access network device enables the terminal device to access randomly-selected one piece of S-NSSAI. Because quality of service of different S-NSSAI may be different, this manner of blindly selecting S-NSSAI is not conducive to obtaining a better service by the terminal device. In addition, the S-NSSAI in the Allowed NSSAI needs to be usable in all the tracking areas in the current registration area of the terminal device. If the Requested NSSAI of the terminal device is not in the Allowed NSSAI, the terminal device cannot use the NSSAI even if the terminal device is in coverage of a Requested S-NSSAI. For example, network slices included in the Requested NSSAI are {slice #1, slice #2, slice #3}, network slices supported by a current tracking area are {slice #2, slice #3, slice #4, slice #5}, and network slices supported by all the tracking areas in the current registration area are {slice #3, slice #4}. In this case, a network slice included in the Allowed NSSAI is {slice #3}, namely, an intersection set between the Requested NSSAI and the network slices supported by all the tracking areas in the current registration area. Because the Allowed NSSAI does not include the slice #2, the terminal device cannot access the slice #2 even if the tracking area in which the terminal device is currently located supports the slice #2. Compared with the slice #3, the slice #2 can provide a better service for the terminal device. Therefore, this method for enabling the terminal device to access the slice #3 cannot provide a better service for the terminal device.

In view of this, this application provides a method, to help a terminal device obtain a better service. The following describes in detail the communication method provided in this application.

Figure 2:
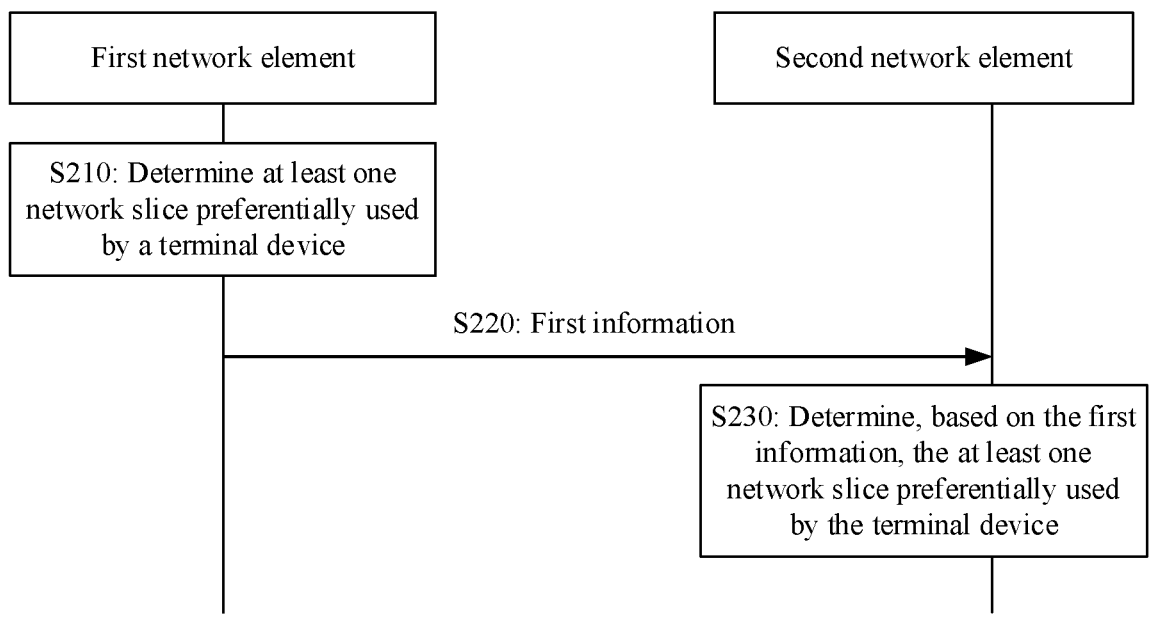
FIG. 2 is a schematic flowchart of a communication method according to an embodiment of this application.

FIG. 2 is a schematic flowchart of a communication method according to an embodiment of this application. The method in FIG. 2 may be applied to the network architecture in FIG. 1.

S210: A first network element determines at least one network slice preferentially used by a terminal device.

Further, the first network element may further determine a priority of the at least one network slice.

Optionally, the at least one network slice may be a network slice that allows to be used by the terminal device. However, this is not limited in the embodiments of this application. For example, the at least one network slice may not belong to the network slice that allows to be used by the terminal device, or the at least one network slice may include a portion or all of the network slice that allows to be used by the terminal device and one or more network slices that do not belong to the network slice that allows to be used by the terminal device. A network slice that allows to be used by the terminal device may correspond to the Allowed NSSAI in the foregoing descriptions, and details are not described herein again.

In this application, the network slice preferentially used by the terminal device may be a network slice that the terminal device expects to access, and the network slice may provide a better service to the terminal device. For example, the network slice preferentially used by the terminal device may be a network slice in which the terminal device expects to preferentially set up a protocol data unit (PDU) session, or may be a network slice with which the terminal device expects to preferentially register. For example, network slices subscribed to by the terminal device include a slice #1, a slice #2, and a slice #3, and bandwidths corresponding to the three slices are 20 MHz, 50 MHz, and 100 MHz in sequence. In this case, the network slice preferentially used by the terminal device is the slice #3, or the slice #3 and the slice #2.

Optionally, in a specific implementation of S210, the first network element may determine, based on subscription information of the terminal device, the at least one network slice preferentially used by the terminal device. Further, the first network element may further determine a priority of the at least one network slice based on the subscription information of the terminal device.

For example, the subscription information of the terminal device may include information about a network slice to which the terminal device subscribes and a priority of each network slice. The at least one network slice determined by the first network element may be all network slices to which the terminal device subscribes. Correspondingly, the priority of the at least one network slice is the priority of each network slice to which the terminal device subscribes in the subscription information. Alternatively, the at least one network slice determined by the first network element may be one or more network slices with a relatively high priority in all network slices to which the terminal device subscribes. Correspondingly, the at least one network slice is a priority respectively corresponding to the one or more network slices with a relatively high priority in the subscription information. Each piece of network slice information in the at least one network slice may be S-NSSAI corresponding to the network slice.

In addition, the first network element may further determine the at least one network slice preferentially used by the terminal device and the priority of the at least one network slice with reference to one or more of three types of information: operator configuration information, load level information of a network slice, and network slice information that is requested by the terminal device (namely, Requested NSSAI). Alternatively, the first network element may separately consider operator configuration information, load level information of a network slice, and/or requested network slice information of the terminal device, to determine the at least one network slice preferentially used by the terminal device and the priority of the at least one network slice.

The operator configuration information may include, for example, a local configuration, and a radio access network capability of the tracking area in which the terminal device is currently located. The local configuration may include access-and-mobility-related policy control (for example, management of service area restrictions), policy control related to terminal device access selection and PDU session selection (for example, a terminal device route selection policy), and the like.

For example, network slices included in a service area in which the terminal device is located are {slice #1, slice #2, slice #3}, a load level of the slice #1 is light load, a load level of the slice #2 is medium load, and a load level of the slice #3 is heavy load. In this case, the first network element may determine that the at least one network slice preferentially used by the terminal device is the slice #1. Alternatively, the first network element may determine that the at least one network slice preferentially used by the terminal device is the slice #1 and the slice #2, where a priority of the slice #1 is 1, and a priority of the slice #2 is 2. In this application, a smaller value representing a priority indicates a higher priority of a corresponding network slice.

For example, network slices included in Requested NSSAI are {slice #1, slice #2, slice #3}, network slices supported by a current tracking area are {slice #2, slice #3, slice #4, slice #5}, and network slices supported by all tracking areas in a current registration area are {slice #3, slice #4}. In this case, a network slice included in the Allowed NSSAI is {slice #3}. However, based on the subscription information of the terminal device, a preferable network slice of the terminal device is the slice #2. In other words, the at least one network slice may not belong to the network slice that allows to be used by the terminal device.

For example, network slices included in Requested NSSAI are {slice #1, slice #2, slice #3, slice #4, slice #5}, network slices supported by a current tracking area are {slice #2, slice #3, slice #4, slice #5}, and network slices supported by all tracking areas in a current registration area are {slice #3, slice #4, slice #5}. In this case, network slices included in the Allowed NSSAI are {slice #3, slice #4, slice #5}. However, based on the subscription information of the terminal device, preferable network slices of the terminal device are {slice #3, slice #4}. Further, a priority of the slice

3 may be higher than that of the slice #4. In other words, the at least one network slice may include a portion or all of the network slice that allows to be used by the terminal device.

For example, network slices included in Requested NSSAI are {slice #1, slice #2, slice #3}, network slices supported by a current tracking area are {slice #2, slice #3, slice #4, slice #5}, and network slices supported by all tracking areas in a current registration area are {slice #3, slice #4}. In this case, a network slice included in the Allowed NSSAI is {slice #3}. However, based on the subscription information of the terminal device, preferable network slices of the terminal device are {slice #2, slice #3}, and further, a priority of the slice #2 is higher than that of the slice #3. In other words, the at least one network slice may include a portion of the network slice that allows to be used by the terminal device and one or more network slices that do not belong to the network slice that allows to be used by the terminal device.

Optionally, in another specific implementation of S210, the first network element may determine, based on information preconfigured for the first network element by an OAM, the at least one network slice preferentially used by the terminal device. Further, the first network element may further determine the priority of the at least one network slice based on the information preconfigured for the first network element by the OAM.

For example, the OAM may preconfigure information about the at least one network slice preferentially used by the terminal device and the priority of the at least one network slice.

S220: The first network element sends first information to a second network element. Correspondingly, the second network element receives the first information.

The first information is used to indicate the at least one network slice preferentially used by the terminal device. For example, the first information may include an identifier of the at least one network slice preferentially used by the terminal device. Further, the first information is further used to indicate the priority of the at least one network slice preferentially used by the terminal device.

Correspondingly, after receiving the first information, the first network element may determine the at least one network slice preferentially used by the terminal device, and may further determine the priority of the at least one network slice.

For example, the first information may be {slice #1, slice #2, slice #3}, representing that the slice #1, slice #2, and slice #3 are all network slices preferentially used by the terminal device. Alternatively, the first information may be {slice #1, priority=1; slice #2, priority=3; slice #3, priority=2}. Alternatively, the first information may be {slice #1, priority=1; slice #2, priority=1; slice #3, priority=2}. Alternatively, the first information may be {slice #1, priority=1; slice #2, priority=2}. Alternatively, the first information may be {slice #1}. The slice #1, slice #2, and slice #3 are all network slices to which the terminal device subscribes, or the slice #1, slice #2, and slice #3 are a portion of network slices to which the terminal device subscribes.

Optionally, in an embodiment of this application, after receiving the first information, the second network element may store, for example, in a context of the terminal device, the first information, or the information about the at least one network slice preferentially used by the terminal device and information about the priority of the at least one network slice.

The second network element may be an access network device. In other words, the access network device may obtain information about the at least one network slice preferentially used by the terminal device, or may obtain both information about the at least one network slice preferentially used by the terminal device and information about a priority of the at least one network slice. In this way, the access network device may enable the terminal device to access the network slice preferentially used by the terminal device.

For example, when a portion or all of the at least one network slice preferentially used by the terminal device belongs to a network slice that allows to be used by the terminal device, and the access network device supports the portion or all of the network slice, the access network device may enable the terminal device to access a network slice that is preferentially used by the terminal device and that allows to be used by the terminal device. For example, the access network device may perform differentiated processing at a network slice level based on the information about the at least one network slice preferentially used by the terminal device, or based on the information about the at least one network slice and the information about the priority of the at least one network slice, to enable the terminal device to preferentially access a network slice that is preferentially used by the terminal device and that allows to be used by the terminal device. The differentiated processing may include at least one of the following processing manners: preferentially using a frequency band that supports one or more network slices that are in the at least one network slice and that belong to the network slice allowing to be used by the terminal device; adjusting an access control parameter configuration; adjusting an RRC measurement parameter configuration (for example, adjusting a priority of a carrier frequency band that supports the network slice preferentially used by the terminal device); when the terminal device is in an idle mode and an inactive mode, instructing the terminal device to perform inter-frequency cell reselection for a network slice (for example, including a cell reselection priority in an RRC release message, where setting a cell priority corresponding to the network slice preferentially used by the terminal device to a high priority is supported); selecting a target access network device for the terminal device during handover (for example, selecting, through information exchange between access network devices, a target access network device that can support the network slice preferentially used by the terminal device); or the like. Alternatively, when a dedicated radio resource management (RRM) policy is used, the information about the at least one network slice preferentially used by the terminal device, or the information about the at least one network slice preferentially used by the terminal device and the information about the priority of the at least one network slice may be used as a factor to be considered.

Alternatively, when a network slice with a highest priority in the at least one network slice preferentially used by the terminal device belongs to the network slice that allows to be used by the terminal device, the access network device may enable the terminal device to access the network slice with the highest priority. For example, the access network device may perform differentiated processing at the network slice level based on information about the network slice with the highest priority, to enable the terminal device to access the network slice with the highest priority. The differentiation processing may include at least one of the following processing manners: preferentially using a frequency band that supports the network slice with the highest priority;

adjusting an access control parameter configuration; adjusting an RRC measurement parameter configuration; when the terminal device is in an idle mode and an inactive mode, instructing the terminal device to perform inter-frequency cell reselection for a network slice; selecting a target access network device for the terminal device during handover; or the like. When a dedicated RRM policy is used, the information about the network slice with the highest priority is used as a factor to be considered.

In this application, in an example, the access control parameter configuration includes an access barred probability parameter, a barred time, and/or the like. The RRC measurement parameter configuration includes at least one of the following: a measurement periodicity, a measurement threshold, a measurement object (for example, a carrier frequency band, a priority of a carrier frequency band, a frequency band of a synchronization message block, a measurement priority of a synchronization message block, or a carrier for a channel state information reference signal), or the like.

For another example, when the network slice with the highest priority or any network slice in the at least one network slice preferentially used by the terminal device does not belong to the network slice that allows to be used by the terminal device or does not belong to a network slice supported by the access network device, the access network device may trigger handover of the terminal device or release of an RRC connection. After the RRC connection is released, the terminal device may perform cell reselection. In a process of triggering the handover of the terminal device or the release of the RRC connection, the access network device may provide the terminal device with the information about the at least one network slice preferentially used by the terminal device and the information about the priority of the at least one network slice, so that the terminal device may preferentially access the network slice preferentially used by the terminal device.

The second network element may alternatively be a core network device. In other words, the core network device may obtain the information about the at least one network slice preferentially used by the terminal device, or may obtain both the information about the at least one network slice preferentially used by the terminal device and the information about the priority of the at least one network slice. Then, the core network device may use, as the network slice that allows to be used by the terminal device, the portion or all of the at least one network slice preferentially used by the terminal device, or the network slice with the highest priority in the at least one network slice. In this way, the access network device may enable the terminal device to access the network slice preferentially used by the terminal device.

In conclusion, the method according to this embodiment of this application helps the access network device preferentially use the network slice preferentially used by the terminal device or enable the terminal device to access the network slice preferentially used by the terminal device, to help the terminal device obtain a better service.

The following describes in detail how to transfer or send the first information.

In this application, optionally, the first information may be transferred through signaling in an initial access process of the terminal device, or may be transferred through signaling in a handover process, or may be transferred through signaling in a context obtaining process of • the terminal device. The following provides detailed descriptions.

Manner 1: The first information is transferred through the signaling in the initial access process of the terminal device.

In this manner, the first network element is a core network device, and the second network element is an access network device.

In other words, the first information is sent by the core network device to the access network device.

In this scenario, the core network device may send the first information by sending an initial context setup request message to the access network device. In other words, the initial context setup request message includes the first information.

Optionally, the initial context setup request message may further include second information, and the second information is used to indicate a network slice that allows to be used by the terminal device.

Manner 2: The first information is transferred through the signaling in the handover process.

In this manner, there are two possible scenarios:
Scenario B:
The first network element is a first access network device, and the second network element is a second access network device. The first access network device is a source access network device, and the second access network device is a target access network device.

In this scenario, the first access network device may send the first information by sending a handover request message to the second access network device. In other words, the handover request message includes the first information.
Scenario C:
The first network element is a core network device, and the second network element is a target access network device.

In this scenario, the core network device may send the first information by sending a path switch request acknowledge message to the second access network device. In other words, the path switch request acknowledge message includes the first information.

Manner 3: The first information is transferred through the signaling in the context obtaining process of the terminal device.

Specifically, the first network element is a first access network device, and the second network element is a second access network device. The first access network device is an old access network device, and the second access network device is a new access network device. The first access network device may send the first information by sending a retrieve UE context response message to the second access network device. In other words, the retrieve UE context response message includes the first information.

The new access network device in this application may be an access network device on which the terminal device currently camps. The old access network device is an access network device accessed by the terminal device when the terminal device is in a connected mode last time.

The following separately describes the foregoing three manners with reference to the flowcharts shown in FIG. 3 to FIG. 7.

Figure 3:
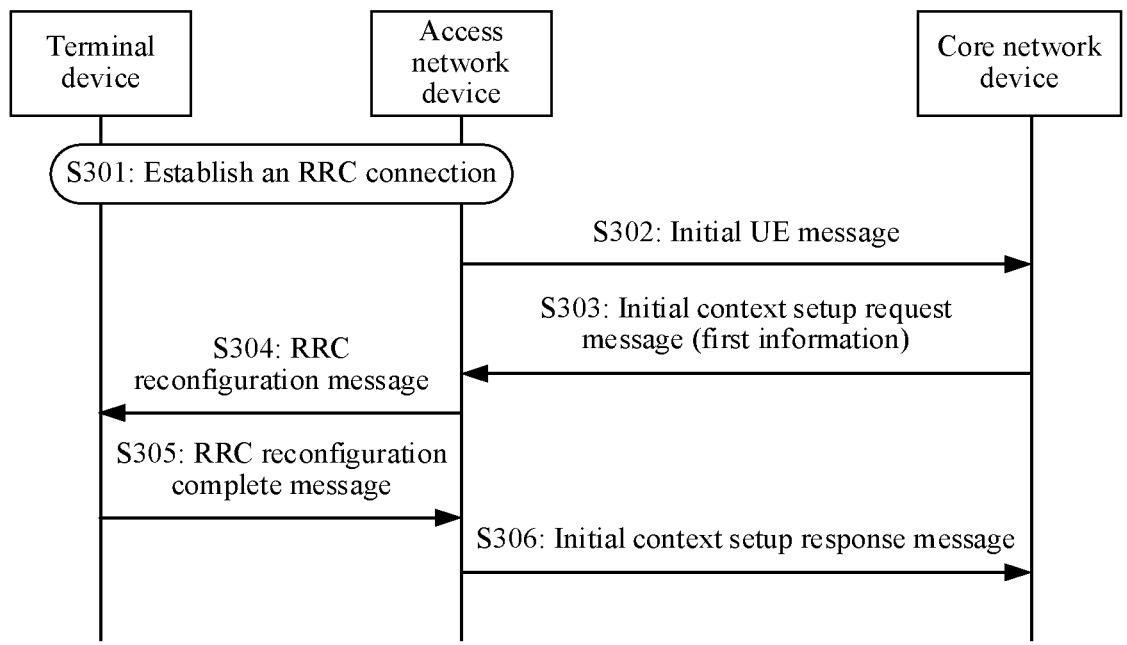
FIG. 3 is a schematic flowchart of a communication method according to a specific embodiment of this application.

FIG. 3 is a schematic flowchart of transferring first information through signaling in an initial access process of a terminal device. It should be understood that the method shown in FIG. 3 may correspond to the scenario A in the foregoing manner 1.

S301: The terminal device sets up an RRC connection to an access network device.

S302: The access network device sends an initial UE message to a core network device. Correspondingly, the core network device receives the initial UE message sent by the access network device. The initial UE message is used to forward a non-access stratum (NAS) message to the core network device. The initial UE message may include a registration request (registration request) message or a service request message.

S303: The core network device sends an initial context setup request message to the access network device, to request to set up, in the access network device, a context of the terminal device. Correspondingly, the access network device receives the initial context setup request message sent by the core network device. The initial context setup request message may include a registration accept message or an N2 request message.

Specifically, after receiving the initial UE message, the core network device may first determine at least one network slice preferentially used by the terminal device, or determine the at least one network slice and a priority of the at least one network slice, and then, when sending the initial context setup request message to the access network device, the core network device sends the first information described above. In other words, the initial context setup request message includes the first information.

For a specific manner in which the core network device determines the at least one network slice preferentially used by the terminal device, or determines the at least one network slice and the priority of the at least one network slice, refer to the foregoing descriptions of S210. Details are not described herein again.

Optionally, after receiving the first information, the access network device may store the first information. For example, the access network device may store information about the at least one network slice preferentially used by the terminal device, and may further store information about the priority of the at least one network slice. The access network device may store the first information in the context of the terminal device.

Optionally, the initial context setup request message may include information about a network slice that allows to be used by the terminal device, namely, Allowed NSSAI.

S304: The access network device sends an RRC reconfiguration message to the terminal device.

Specifically, if a portion or all of the at least one network slice preferentially used by the terminal device belongs to the network slice that allows to be used by the terminal device, and the access network device supports the portion or all of the network slice, the access network device may determine the RRC reconfiguration message based on the portion or all of the network slice. The RRC reconfiguration message is used to enable the terminal device to access the portion or all of the network slice. The RRC reconfiguration message may include an RRC connection reconfiguration parameter, for example, an RRC measurement parameter (such as a measurement periodicity, a measurement threshold, or a measurement object (such as a carrier frequency band, a priority of a carrier frequency band, a frequency band of a synchronization message block, a measurement priority of a synchronization message block, or a carrier for a channel state information reference signal)). In other words, the terminal device may preferentially use the portion or all of the network slice by adjusting the RRC connection reconfiguration parameter. Alternatively, if a network slice with a highest priority in the at least one network slice belongs to the network slice that allows to be used by the terminal device, and the access network device supports the network slice with the highest priority, the access network device may enable the terminal device to access the network slice with the highest priority by adjusting the RRC connection reconfiguration parameter. Herein, for example, the access network device may include, in the RRC reconfiguration message, a carrier frequency band corresponding to the network slice with the highest priority, to enable the terminal device to access the network slice with the highest priority.

In addition, if any one of the at least one network slice preferentially used by the terminal device or the network slice with the highest priority in the at least one network slice does not belong to the network slice that allows to be used by the terminal device, or the access network device does not support any one of the at least one network slice or the network slice with the highest priority, the access network device may trigger handover of the terminal device or release of the RRC connection. After the RRC connection is released, the terminal device may perform cell reselection. Optionally, the access network device may further provide the first information to the terminal device, so that the terminal device may preferentially access a network slice preferentially used by the terminal device. For example, the access network device may provide the first information to the terminal device in a process of triggering the handover of the terminal device or the release of the RRC connection.

S305: The terminal device sends an RRC reconfiguration complete message to the access network device.

S306: The access network device sends an initial context setup response message to the core network device. Correspondingly, the core network device receives an initial context setup response message sent by the access network device. The initial context setup response message may include a registration complete message or an N2 request acknowledge message.

In conclusion, the core network device sends, to the access network device, the information about the at least one network slice preferentially used by the terminal device, or the information about the at least one network slice preferentially used by the terminal device and the information about the priority of the at least one network slice, so that the access network device may enable the terminal device to access an appropriate network slice, in other words, the access network device may enable the terminal device to access a proper network slice, to help the terminal device obtain an appropriate service.

For example, network slices included in Requested NSSAI are {slice #1, slice #2, slice #3}, network slices supported by a current tracking area are {slice #2, slice #3, slice #4, slice #5}, and network slices supported by all tracking areas in a current registration area are {slice #3, slice #4}. In this case, a network slice included in Allowed NSSAI is {slice #3}. However, based on subscription information of the terminal device, a preferable network slice of the terminal device is the slice #2. If the initial context setup request message sent by the core network device to the access network device includes only the Allowed NSSAI according to a current technology, the access network device allows the terminal device to access only the slice #3. Compared with the slice #3, the slice #2 provides a better service. Therefore, according to this application, the initial context setup request message sent by the core network device to the access network device includes information about the slice #2 preferentially used by the terminal device. In this case, the access network device may trigger the terminal device to release an RRC connection, so as to perform cell reselection, or trigger a handover process. In this way, the terminal device may access the slice #2, to obtain a proper or a better service.

For another example, network slices included in Requested NSSAI are {slice #1, slice #2, slice #3, slice #4, slice #5}, network slices supported by a current tracking area are {slice #2, slice #3, slice #4, slice #5}, and network slices supported by all tracking areas in a current registration area are {slice #3, slice #4, slice #5}. In this case, network slices included in the Allowed NSSAI are {slice #3, slice #4, slice #5}. However, based on the subscription information of the terminal device, preferable network slices of the terminal device are {slice #3, slice #4}, and a priority of the slice #3 is higher than that of the slice #4. If the initial context setup request message sent by the core network device to the access network device includes only the Allowed NSSAI according to a current technology, the access network device randomly allows the terminal device to access the slice #3, slice #4, or slice #5. However, according to this application, the initial context setup request message sent by the core network device to the access network device includes the slice #3 and slice #4 that are preferentially used by the terminal device, and the priority of the slice #3 is higher than the priority of the slice #4. In this case, the access network device allows the terminal device to access the slice #3, to help the terminal device obtain a better service.

Figure 4:
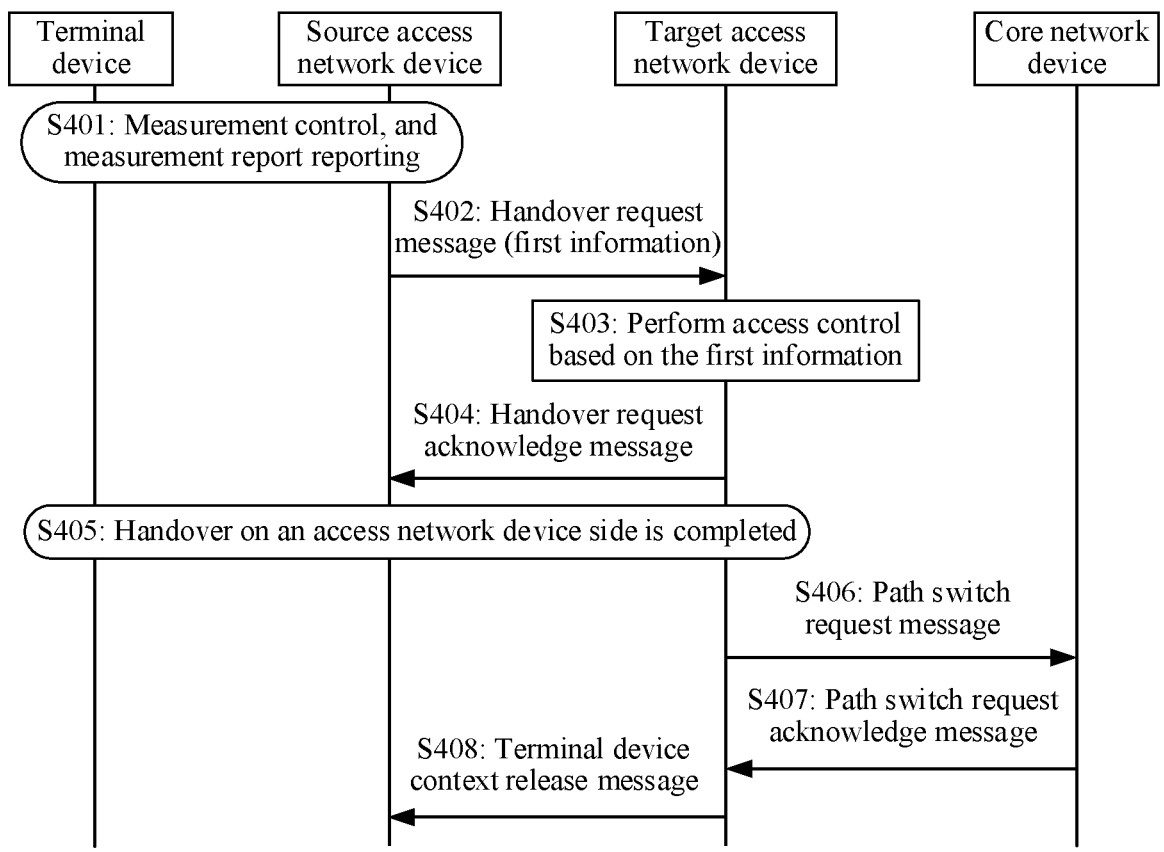
FIG. 4 is a schematic flowchart of a communication method according to a specific embodiment of this application.

FIG. 4 is a schematic flowchart of transferring first information through signaling in a handover process. It should be understood that the method shown in FIG. 4 may correspond to the scenario B in the foregoing manner 2.

S401: A source access network device performs measurement control, and a terminal device reports a measurement report.

For details of the process, refer to a current technology. Details are not described herein.

S402: The source access network device sends a handover request message to the target access network device, to request the target access network device to prepare a related resource for handover. Correspondingly, the target access network device receives the handover request message sent by the source access network device.

Before sending the handover request message to the target access network device, the source access network device may first determine at least one network slice preferentially used by the terminal device, or determine the at least one network slice and a priority of the at least one network slice. Then, when sending the handover request message, the source access network device may send the first information. In other words, the handover request message includes the first information. For a specific manner in which the source access network device determines the at least one network slice preferentially used by the terminal device, or determines the at least one network slice and the priority of the at least one network slice, refer to the foregoing descriptions of S210. Details are not described herein again.

Optionally, the handover request message may include information about a network slice that allows to be used by the terminal device and requested network slice information of the terminal device.

S403: The target access network device performs access control based on the first information.

For example, the target access network device may perform access control based on received information about the at least one network slice preferentially used by the terminal device, a resource usage status of the target access network device, and the like.

For example, after receiving the handover request message, the target access network device may determine, based on the first information, the at least one network slice preferentially accessed by the terminal device, or may further determine the priority of the at least one network slice. If the target access network device supports a portion or all of the at least one network slice or supports a network slice with a highest priority in the at least one network slice, and the portion or all of the network slice or the network slice with the highest priority belongs to the network slice that allows to be used by the terminal device, the target access network device may preferentially enable the terminal device to access the portion or all of the at least one network slice or the network slice with the highest priority in the at least one network slice.

For example, the target access network device may perform RRC connection reconfiguration on the terminal device based on the portion or all of the at least one network slice or the network slice with the highest priority in the at least one network slice, to enable the terminal device to access the portion or all of the at least one network slice or support the network slice with the highest priority in the at least one network slice. For example, the RRC connection reconfiguration may include configuring an RRC measurement parameter (such as a measurement periodicity, a measurement threshold, or a measurement object (for example, a carrier frequency band, a priority of a carrier frequency band, a frequency band of a synchronization message block, a measurement priority of a synchronization message block, or a carrier for a channel state information reference signal)).

For another example, based on the portion or all of the at least one network slice or the network slice with the highest priority in the at least one network slice, the target access network device may alternatively perform admission control that is based on network slice information, for example, when the portion or all of the at least one network slice or the network slice with the highest priority in the at least one network slice is congested, reject a handover request of the source access network device.

Optionally, after receiving the first information, the target access network device may store the first information in a context of the terminal device.

S404: The target access network device sends a handover request acknowledge message to the source access network device, to notify the source access network device that the target access network device has prepared the related resource. Correspondingly, the source access network device receives a handover request acknowledge message sent by the target access network device.

For example, if the target access network device supports the portion or all of the at least one network slice or supports the network slice with the highest priority in the at least one network slice, and the portion or all of the network slice or the network slice with the highest priority belongs to the network slice that allows to be used by the terminal device, the target access network device may send a handover request acknowledge message to the source access network device, to enable the terminal device to access the portion or all of the network slice or the network slice with the highest priority. Otherwise, the target access network device sends a handover preparation failure message to the source access network device. It should be understood that in this case, the subsequent steps are not performed.

S405: The source access network device, the target access network device, and the terminal device complete handover on an access network device side, including uplink/downlink packet data convergence protocol (PDCP) sequence number state transition, and the like.

S406: The target access network device sends a path switch request (path switch request) message to a core network device, to request a core network to send downlink data of the terminal device to the target access network device. Correspondingly, the core network device receives the path switch request message sent by the target access network device.

S407: The core network device sends a path switch request acknowledge message to the target access network device, to notify the target access network device that the core network has completed path switching. Correspondingly, the target access network device receives the path switch request acknowledge message sent by the core network device.

S408: The target access network device sends a terminal device (or UE) context release message to the source access network device, to notify the source access network device that the target access network device has completed handover, so that the source access network device may release the context of the terminal device. Correspondingly, the source access network device receives the terminal device context release message sent by the target access network device.

According to the method in this embodiment of this application, the source access network device sends the first information to the target access network device, so that when supporting the network slice preferentially used by the terminal device, the target access network device may enable the terminal device to access the network slice preferentially used by the terminal device.

Figure 5:
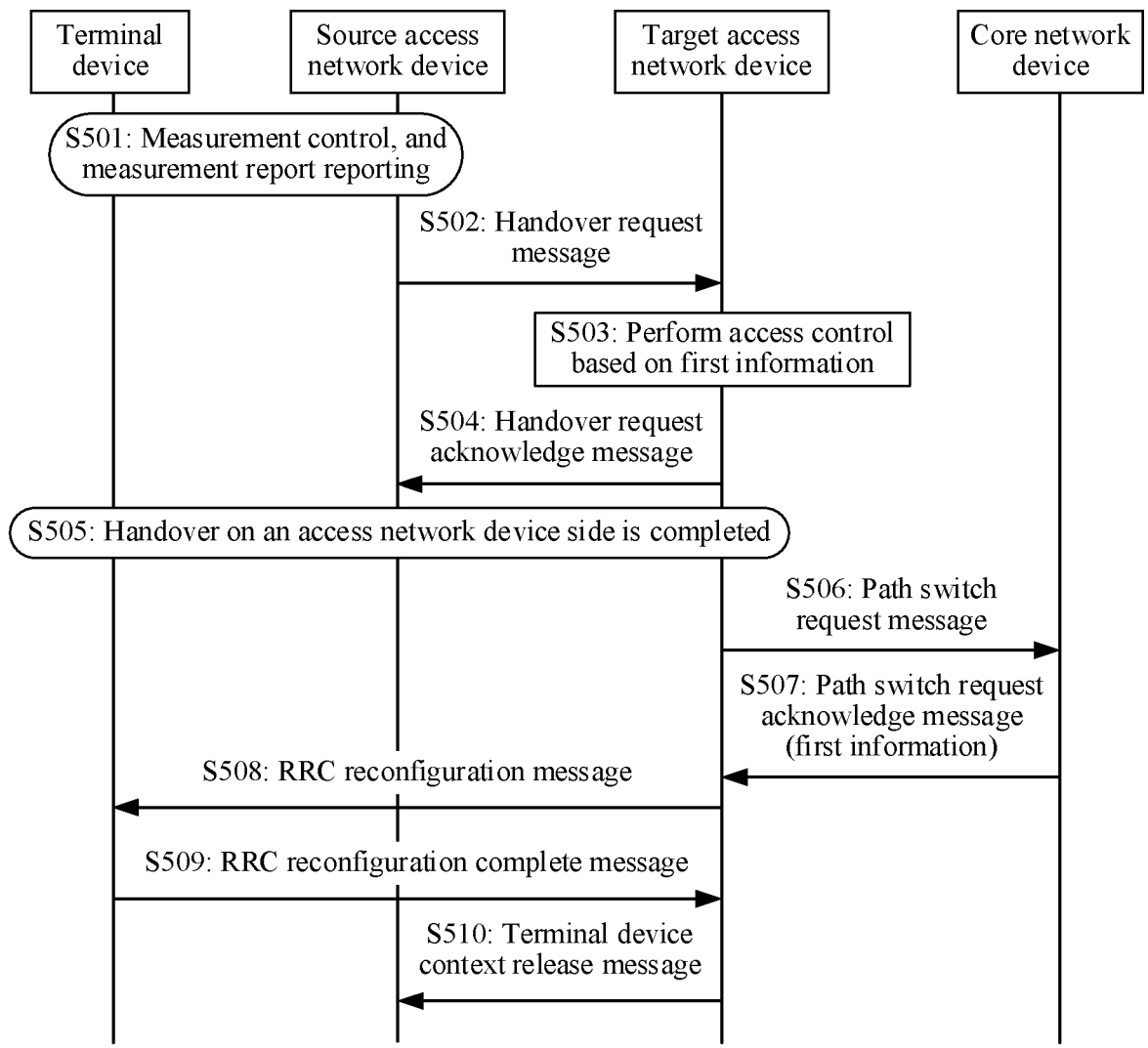
FIG. 5 is a schematic flowchart of a communication method according to a specific embodiment of this application.

FIG. 5 is a schematic flowchart of transferring first information through signaling in a handover process. It should be understood that the method shown in FIG. 6 may correspond to the scenario C in the foregoing manner 2.

S501: A source access network device performs measurement control, and a terminal device reports a measurement report.

For details of the process, refer to a current technology. Details are not described herein.

S502: The source access network device sends a handover request (handover request) message to the target access network device, to request the target access network device to prepare a related resource for handover. Correspondingly, the target access network device receives the handover request message sent by the source access network device.

Optionally, the handover request message may include information about a network slice that allows to be used by the terminal device and requested network slice information of the terminal device.

S503: The target access network device performs access control.

For details, refer to a current technology. Details are not described herein.

S504: The target access network device sends a handover request acknowledge message to the source access network device, to notify the source access network device that the target access network device has prepared the related resource. Correspondingly, the source access network device receives a handover request acknowledge message sent by the target access network device.

S505: The source access network device, the target access network device, and the terminal device complete handover on an access network device side, including uplink/downlink PDCP sequence number state transition, and the like.

S506: The target access network device sends a path switch request message to a core network device, to request a core network to send downlink data of the terminal device to the target access network device. Correspondingly, the core network device receives the path switch request message sent by the target access network device.

S507: The core network device sends a path switch request acknowledge message to the target access network device, to notify the target access network device that the core network has completed path switching. Correspondingly, the target access network device receives the path switch request acknowledge message sent by the core network device. The path switch request acknowledge message includes the first information.

Before sending the path switch request acknowledge message to the target access network device, the core network device may first determine at least one network slice preferentially used by the terminal device, or determine the at least one network slice and a priority of the at least one network slice. Then, when sending the path switch request acknowledge message, the core network device may send the first information. In other words, the path switch request acknowledge message includes the first information. For a specific manner in which the core network device determines the at least one network slice preferentially used by the terminal device, or determines the at least one network slice and the priority of the at least one network slice, refer to the foregoing descriptions of S210. Details are not described herein again.

Optionally, after receiving the first information, in a context of the terminal device, the target access network device may store the first information, or store information about the at least one network slice preferentially used by the terminal device, and may further store information about the priority of the at least one network slice.

S508: The target access network device sends an RRC reconfiguration message to the terminal device.

Specifically, if a portion or all of the at least one network slice preferentially used by the terminal device belongs to the network slice that allows to be used by the terminal device, and the target access network device supports the portion or all of the network slice, the target access network device may determine the RRC reconfiguration message based on the portion or all of the network slice. The RRC reconfiguration message is used to enable the terminal device to access the portion or all of the network slice. The RRC reconfiguration message may include an RRC connection reconfiguration parameter, for example, an RRC measurement parameter (such as a measurement periodicity, a measurement threshold, or a measurement object (such as a carrier frequency band, a priority of a carrier frequency band, a frequency band of a synchronization message block, a measurement priority of a synchronization message block, or a carrier for a channel state information reference signal)). In other words, the terminal device may preferentially use the portion or all of the network slice by adjusting the RRC connection reconfiguration parameter. Alternatively, if a network slice with a highest priority in the at least one network slice belongs to the network slice that allows to be used by the terminal device, and the target access network device supports the network slice with the highest priority, the target access network device may enable the terminal device to access the network slice with the highest priority by adjusting the RRC connection reconfiguration parameter. Herein, for example, the target access network device may include, in the RRC reconfiguration message, a carrier frequency band corresponding to the network slice with the highest priority, to enable the terminal device to access the network slice with the highest priority.

In addition, if any one of the at least one network slice preferentially used by the terminal device or the network slice with the highest priority in the at least one network slice does not belong to the network slice that allows to be used by the terminal device, or the target access network device does not support any one of the at least one network slice or the network slice with the highest priority, the target access network device may trigger handover of the terminal device or release of an RRC connection. After the RRC connection is released, the terminal device may perform cell reselection. Optionally, the target access network device may further provide the first information to the terminal device, so that the terminal device may preferentially access a network slice preferentially used by the terminal device. For example, the target access network device may provide the first information to the terminal device in a process of triggering the handover of the terminal device or the release of the RRC connection.

S509: The terminal device sends an RRC reconfiguration complete message to the target access network device.

S510: The target access network device sends a terminal device (or UE) context release message to the source access network device, to notify the source access network device that the target access network device has completed handover, so that the source access network device may release the context of the terminal device. Correspondingly, the source access network device receives the terminal device context release message sent by the target access network device.

According to the method in this embodiment of this application, the core network device sends the first information to the target access network device, to help the target access network device enable the terminal device to access the network slice preferentially used by the terminal device.

Figure 6:
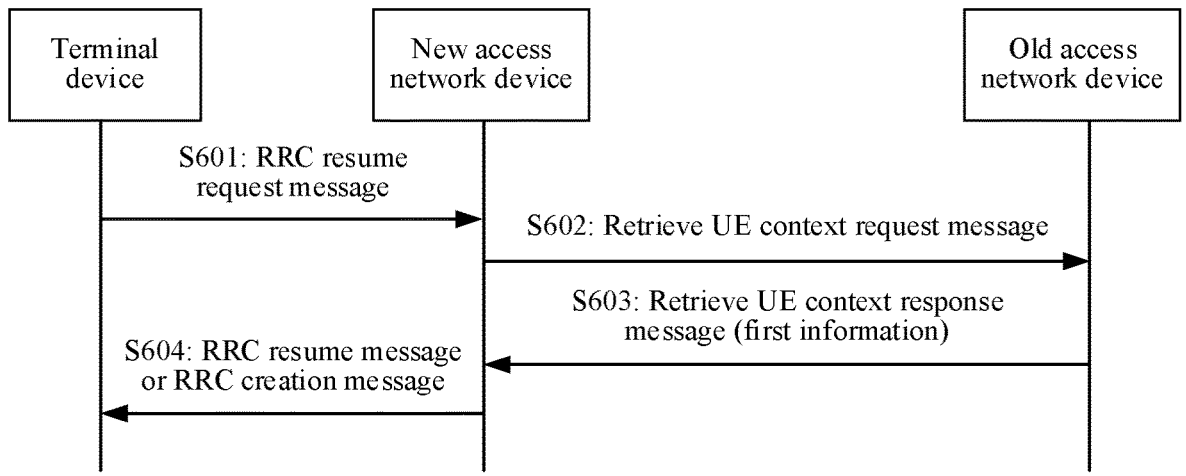
FIG. 6 is a schematic flowchart of a communication method according to a specific embodiment of this application.

FIG. 6 is a schematic flowchart of transferring first information through signaling in a context obtaining process of a terminal device. It should be understood that the method shown in FIG. 6 may correspond to the foregoing manner 3.

In the method in FIG. 6, when the terminal device is in an inactive mode, the terminal device moves from a first access network device to a second access network device. In addition, in a process in which the terminal device is switched from the inactive mode to a connected mode, the second access network device needs to obtain a context of the terminal device from the first access network device. A terminal device context response message sent by the first access network device to the second access network device may include information about at least one network slice preferentially used by the terminal device, or include information about at least one network slice preferentially used by the terminal device and information about a priority of the at least one network slice, so that the second access network device enables, based on the foregoing information, the terminal device to access the network slice preferentially used by the terminal device.

S601: The terminal device sends an RRC resume request (RRC resume request) message to the second access network device, where the RRC resume request message may indicate a resume reason, for example, a periodic notification area update request, or an initial signaling request of the terminal. Correspondingly, the second access network device receives the RRC resume request message sent by the terminal device.

S602: The second access network device sends a retrieve UE context request message to the first access network device, to request the first access network device to forward a UE context to the second access network device. Correspondingly, the first access network device receives the retrieve UE context request message sent by the second access network device.

S603: The first access network device sends a retrieve UE context response message to the second access network device. Correspondingly, the second access network device receives a retrieve UE context response message sent by a source access network device. The retrieve UE context response message includes the first information.

Before sending the retrieve UE context response message to a target access network device, the first access network device may first determine at least one network slice preferentially used by the terminal device, or determine the at least one network slice and a priority of the at least one network slice. Then, when sending the retrieve UE context response message, the first access network device may send the first information. In other words, the retrieve UE context response message includes the first information. For a specific manner in which the first access network device determines the at least one network slice preferentially used by the terminal device, or determines the at least one network slice and the priority of the at least one network slice, refer to the foregoing descriptions of S210. Details are not described herein again.

Optionally, the retrieve UE context response may include information about a network slice that allows to be used by the terminal device and requested network slice information of the terminal device.

Optionally, after receiving the first information, in a context of the terminal device, the second access network device may store the first information, or store information about the at least one network slice preferentially used by the terminal device, and may further store information about the priority of the at least one network slice.

S604: The second access network device sends an RRC resume message or an RRC creation message to the terminal device. Correspondingly, the terminal device receives the RRC resume message or the RRC creation message sent by the second access network device.

The second access network device may perform RRC resumption or RRC creation on the terminal device based on the information about the at least one piece of network slice preferentially used by the terminal device, or the information about the at least one network slice preferentially used by the terminal device and the information about the priority of the at least one network slice, to enable the terminal device to access the network slice preferentially used by the terminal device. For example, when performing RRC resumption, the second access network device may send, to the terminal device, a carrier frequency corresponding to a network slice with a highest priority, to enable the terminal device to access the network slice with the highest priority.

In this embodiment of this application, in a process in which the terminal device is switched from an inactive mode to a connected mode, the second access network device on which the terminal device currently camps receives a retrieve terminal device context response message from the first access network device on which the terminal device camps last time, and the retrieve terminal device context response message includes the information about the at least one network slice preferentially used by the terminal device and/or the priority of the at least one network slice, so that the first access network device enables, based on the information, the terminal device to access the network slice preferentially used by the terminal device.

In addition, this application further provides a communication method. According to the communication method, a core network device may send first information to an access network device through an initial UE message. The core network device may determine, with reference to the first information, a network slice that allows to be used by a terminal device. The network slice that allows to be used by the terminal device may include a portion or all of at least one network slice preferentially used by the terminal device. When determining, based on the first information, the network slice that allows to be used by the terminal device, the core network device may further make reference to one or more of requested network slice information of the terminal device, a local configuration, a radio access network capability of a tracking area in which the terminal device is currently located, and other local usable information (for example, load level information of a network slice). After determining the network slice that allows to be used by the terminal device, the core network device may send, through an initial context setup request message, information about the network slice that allows to be used by the terminal device. Therefore, in conclusion, the access network device sends the first information to the core network device, and the core network device obtains, with reference to the information about the at least one network slice preferentially used by the terminal device or further with reference to information about a priority of the at least one network slice, the network slice that allows to be used by the terminal device, to help the terminal device access the network slice preferentially used by the terminal device.

Figure 7:
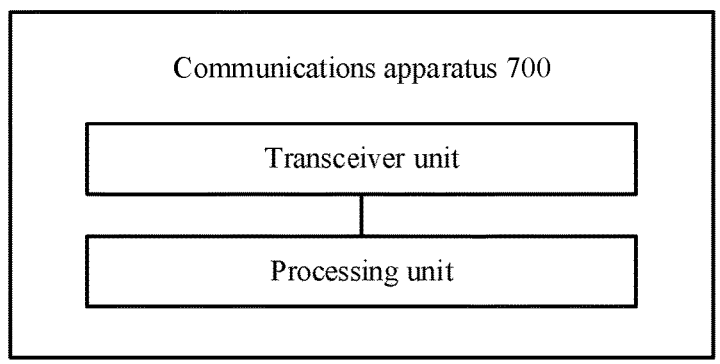
FIG. 7 is a schematic block diagram of a communications apparatus according to an embodiment of this application.

FIG. 7 is a schematic block diagram of an example of a communications apparatus 700 according to an embodiment of this application.

In an implementation, the apparatus 700 may correspond to (for example, be configured in or be) the first network element described in the method shown in FIG. 2, the core network device in the method shown in FIG. 3, the source access network device in the method shown in FIG. 4, the core network device in the method shown in FIG. 5, or the first access network device in the method shown in FIG. 6. In addition, modules or units in the apparatus 400 are respectively configured to perform the functions and the executed actions or processing processes of the first network element described in the method shown in FIG. 2, the core network device in the method shown in FIG. 3, the source access network device in the method shown in FIG. 4, the core network device in the method shown in FIG. 5, or the first access network device in the method shown in FIG. 6. To avoid repetition, detailed descriptions thereof are omitted herein.

In another implementation, the apparatus 700 may correspond to (for example, be configured in or be) the second network element described in the method shown in FIG. 2, the access network device in the method shown in FIG. 3, the target access network device in the method shown in FIG. 4, the target network device in the method shown in FIG. 5, or the second access network device in the method shown in FIG. 6. In addition, modules or units in the apparatus 400 are respectively configured to perform the functions and the executed actions or processing processes of the second network element described in the method shown in FIG. 2, the access network device in the method shown in FIG. 3, the target access network device in the method shown in FIG. 4, the target network device in the method shown in FIG. 5, or the second access network device in the method shown in FIG. 6. To avoid repetition, detailed descriptions thereof are omitted herein.

It should be understood that the processing unit in FIG. 7 is an optional unit.

Figure 8:
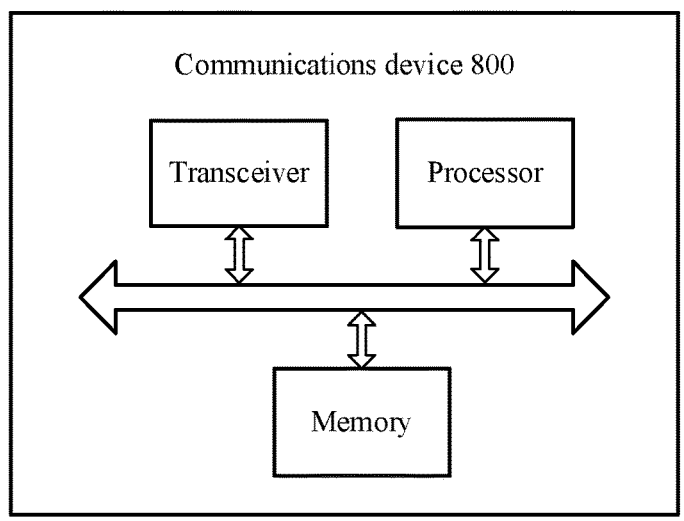
FIG. 8 is a schematic block diagram of a communications device according to an embodiment of this application.

FIG. 8 is a schematic block diagram of an example of a communications device 800 according to an embodiment of this application. The device 800 includes a processor and a transceiver. The processor is in communication connection with the transceiver. Optionally, the device 800 further includes a memory. The memory is in communication connection with the processor. The memory may be configured to store instructions. The processor is configured to execute the instructions stored in the memory, to control the transceiver to send or receive information or a signal.

In a possible implementation, the processor is configured to execute instructions stored in the memory, to enable the device 800 to perform the functions and the executed actions or processing processes of the first network element described in the method shown in FIG. 2, the core network device in the method shown in FIG. 3, the source access network device in the method shown in FIG. 4, the core network device in the method shown in FIG. 5, or the first access network device in the method shown in FIG. 6. In this case, the device 800 may correspond to (for example, be configured in or be) the first network element described in the method shown in FIG. 2, the core network device described in the method shown in FIG. 3, the source access network device described in the method shown in FIG. 4, the core network device described in the method shown in FIG. 5, or the first access network device described in the method shown in FIG. 6. In addition, modules or units in the device 800 are respectively configured to perform the functions and the executed actions or processing processes of the first network element described in the method shown in FIG. 2, the core network device in the method shown in FIG. 3, the source access network device in the method shown in FIG. 4, the core network device in the method shown in FIG. 5, or the first access network device in the method shown in FIG. 6. To avoid repetition, detailed descriptions thereof are omitted herein.

In another implementation, the processor is configured to execute instructions stored in the memory, to enable the device 800 to perform the functions and the executed actions or processing processes of the second network element described in the method shown in FIG. 2, the access network device in the method shown in FIG. 3, the target access network device in the method shown in FIG. 4, the target access network device in the method shown in FIG. 5, or the second access network device in the method shown in FIG. 6. In this case, the device 800 may correspond to (for example, be configured in or be) the second network element described in the method shown in FIG. 2, the access network device in the method shown in FIG. 3, the target access network device in the method shown in FIG. 4, the target access network device in the method shown in FIG. 5, or the second access network device in the method shown in FIG. 6. In addition, modules or units in the device 800 are respectively configured to perform the functions and the executed actions or processing processes of the second network element described in the method shown in FIG. 2, the access network device in the method shown in FIG. 3, the target access network device in the method shown in FIG. 4, the target access network device in the method shown in FIG. 5, or the second access network device in the method shown in FIG. 6. To avoid repetition, detailed descriptions thereof are omitted herein.

It should be noted that the embodiments of this application may be used in the processor, or implemented by the processor. The processor may be an integrated circuit chip and has a signal processing capability. In an implementation process, the steps in the foregoing method embodiments may be completed by using an integrated logical circuit of hardware in the processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and accomplished by a hardware decoding processor, or may be performed and accomplished by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memories in the systems and methods described in this specification include but are not limited to these memories and any memory of another suitable type.

According to the methods provided in the embodiments of this application, this application further provides a computer program product. The computer program product includes computer program code. When the computer program code is run on a computer, the computer is enabled to perform the method in the embodiment shown in any one of FIG. 2 to FIG. 6.

According to the methods provided in the embodiments of this application, this application further provides a computer-readable medium. The computer-readable medium stores program code. When the program code is run on a computer, the computer is enabled to perform the method in the embodiment shown in any one of FIG. 2 to FIG. 6.

According to the methods provided in the embodiments of this application, this application further provides a system, including the foregoing one or more terminal devices, the foregoing one or more access network devices, and one or more core network devices.

All or some of the foregoing embodiments may be implemented by using software, hardware, firmware, or any other combination thereof. When software is used to implement the embodiments, all or some of the foregoing embodiments may be implemented in a form of a computer program product. The computer program product includes one or more computer instructions. When the computer program instructions are loaded or executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that sequence numbers of the foregoing processes do not mean an execution sequence in the embodiments of this application. The execution sequence of the processes should be determined based on functions and internal logic of the processes, and should not be construed as any limitation on the implementation processes of the embodiments of this application.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The term "and/or" in this application describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

In the several embodiments provided in this application, it should be understood that the disclosed system, apparatus, and method may be implemented in other manners. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A communication method, comprising:
   sending, by a radio access network (RAN) device, an initial user equipment message to an access and mobility management function (AMF) device;
   receiving, by the RAN device, an initial context setup request message sent by the AMF device, wherein the initial context setup request message comprises first information used to indicate at least one network slice preferentially used by a terminal device; and
   sending a handover preparation failure message to the RAN device when it is determined not to enable the terminal device to access a portion or all of the at least one network slice.

2. The method according to claim 1, wherein the first information is further used to indicate a priority of the at least one network slice.

3. The method according to claim 1, wherein the method further comprises:
   sending, by the RAN device, a radio resource control reconfiguration message to the terminal device, wherein the reconfiguration message is determined based on the first information, to enable the terminal device to access a portion or all of the at least one network slice.

4. The method according to claim 1, wherein the method further comprises:
   triggering, by the RAN device, handover of the terminal device or release of a radio resource control connection.

5. The method according to claim 1, wherein the first information is obtained by the AMF device from subscription information of the terminal device;
   the first information is determined by the AMF device based on one or more of subscription information of the terminal device, operator configuration information, and requested network slice information of the terminal device; or
   the first information is preconfigured for the AMF device by an operation, administration and maintenance system.

6. A communication method, comprising:
   receiving, by an access and mobility management function (AMF) device, an initial user equipment UE message sent by a radio access network (RAN) device;
   sending, by the AMF device, an initial context setup request message to the RAN device, wherein the initial context setup request message comprises first information used to indicate at least one network slice preferentially used by a terminal device; and
   sending a handover preparation failure message to the RAN device when it is determined not to enable the terminal device to access a portion or all of the at least one network slice.

7. The method according to claim 6, wherein the first information is further used to indicate a priority of the at least one network slice.

8. The method according to claim 6, wherein the first information is obtained by the AMF device from subscription information of the terminal device;
   the first information is determined by the AMF device based on one or more of subscription information of the terminal device, operator configuration information, and requested network slice information of the terminal device; or
   the first information is preconfigured for the AMF device by an operation, administration and maintenance system.

9. A communications apparatus, comprising:
   at least one processor coupled to a memory and a transceiver, the memory storing programming instructions configured to instruct the at least one processor to perform operations comprising:
   receiving an initial user equipment message sent by a radio access network (RAN) device;
   sending an initial context setup request message to the RAN device, wherein the initial context setup request message comprises first information, and the first information is used to indicate at least one network slice preferentially used by a terminal device; and
   sending a handover preparation failure message to the RAN device when it is determined not to enable the terminal device to access a portion or all of the at least one network slice.

10. The apparatus according to claim 9, wherein the first information is further used to indicate a priority of the at least one network slice.

11. The apparatus according to claim 9, wherein the first information is obtained by the apparatus from subscription information of the terminal device;

the first information is determined by the apparatus based on one or more of subscription information of the terminal device, operator configuration information, and requested network slice information of the terminal device; or the first information is preconfigured for an access and mobility management function (AMF) device by an operation, administration and maintenance system.

12. A communications apparatus, comprising:

at least one processor coupled to a memory and a transceiver, the memory storing programming instructions configured to instruct the at least one processor to perform operations comprising:

receiving a handover request message sent by a radio access network (RAN) device, wherein the handover request message comprises first information, and the first information is used to indicate at least one network slice preferentially used by a terminal device;

sending a handover request response to the RAN device based on the first information; and sending a handover preparation failure message to the RAN device when it is determined not to enable the terminal device to access a portion or all of the at least one network slice.

13. The apparatus according to claim 12, wherein the first information is further used to indicate a priority of the at least one network slice.

14. The apparatus according to claim 12, wherein the operations further comprise:

sending the handover request acknowledge message to the RAN device when it is determined to enable the terminal device to access a portion or all of the at least one network slice.

15. The apparatus according to claim 12, wherein the first information is obtained by the RAN device from subscription information of the terminal device;

the first information is determined by the RAN device based on one or more of subscription information of the terminal device, operator configuration information, and requested network slice information of the terminal device; or the first information is preconfigured for the RAN device by an operation, administration and maintenance system.

16. The apparatus according to claim 12, wherein the programming instructions are further configured to instruct the at least one processor to send a radio resource control (RRC) reconfiguration message to the terminal device.

17. The apparatus according to claim 12, wherein the programming instructions are further configured to instruct the at least one processor to trigger handover of the terminal device or release of a radio resource control connection.

* * * * *